United States Patent
Blanchard

(10) Patent No.: US 7,867,465 B2
(45) Date of Patent: Jan. 11, 2011

(54) COLD WALL HORIZONTAL AMMONIA CONVERTER

(75) Inventor: Kenneth L. Blanchard, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 119 days.

(21) Appl. No.: 12/128,730

(22) Filed: May 29, 2008

(65) Prior Publication Data

US 2009/0297427 A1 Dec. 3, 2009

(51) Int. Cl.
*C01C 1/04* (2006.01)

(52) U.S. Cl. .................... 423/360; 423/359; 423/361; 423/362

(58) Field of Classification Search ............. 423/359, 423/360, 361, 362
See application file for complete search history.

(56) References Cited

U.S. PATENT DOCUMENTS

| | | | |
|---|---|---|---|
| 4,180,543 A * | 12/1979 | Ward ..................... | 422/148 |
| 4,568,532 A | 2/1986 | Benner et al. | |
| 5,523,483 A | 6/1996 | Singh et al. | |
| 5,736,116 A | 4/1998 | LeBlanc et al. | |
| 5,882,606 A | 3/1999 | Zardi et al. | |
| 6,132,687 A * | 10/2000 | Noe ..................... | 422/148 |
| 6,171,570 B1 | 1/2001 | Czuppon | |
| 6,299,849 B1 | 10/2001 | Pagani et al. | |
| 7,070,750 B2 | 7/2006 | Lippmann et al. | |
| 7,115,239 B2 | 10/2006 | Forni et al. | |
| 7,172,743 B2 * | 2/2007 | Ungar et al. ............. | 423/360 |
| 2004/0154223 A1 * | 8/2004 | Powell et al. ............ | 48/197 R |
| 2006/0002840 A1 | 1/2006 | Barnett et al. | |

OTHER PUBLICATIONS

Ihrig, "Attack of Hydrogen-Nitrogen Mixtures on Steels." Ind. Eng. Chem., 1949, 41 (11), pp. 2516-2521.*

* cited by examiner

*Primary Examiner*—Timothy C Vanoy
*Assistant Examiner*—Daniel Berns
(74) *Attorney, Agent, or Firm*—KBR Legal Dept.

(57) ABSTRACT

Systems and methods for producing ammonia. Nitrogen and hydrogen can be supplied to a reaction zone disposed inside an inner shell. The inner shell can be disposed inside an outer shell such that a space is formed therebetween. The reaction zone can include at least one catalyst bed in indirect heat exchange with the space. The nitrogen and hydrogen can be reacted in the reaction zone in the presence of at least one catalyst to form an effluent comprising ammonia. The effluent can be recovered from the inner shell and cooled to provide a cooled effluent stream. A cooling fluid can be provided to the outer shell such that the cooling fluid flows through at least a portion of the space and is in fluid communication with the exterior of the inner shell. At least a portion of the cooled effluent can provide at least a portion of the cooling fluid. The cooling fluid can then be recovered from the outer shell as an ammonia product.

15 Claims, 3 Drawing Sheets

COLD WALL HORIZONTAL AMMONIA CONVERTER

BACKGROUND

1. Field

The present embodiments generally relate to methods for exothermal synthesis. More particularly, embodiments of the present invention relate to methods for synthesis of ammonia and other chemicals using one or more catalyst beds.

2. Description of the Related Art

Conventional exothermic chemical synthesis reactors feature an exothermal reaction chamber having catalyst beds contained in a catalyst containment basket or a "basket" that is disposed inside an outer pressure shell. The catalyst beds are contained in the basket so that the outer pressure shell is not directly exposed to the high temperatures inherent in the exothermic synthesis reaction. The outer pressure shell is typically cooled by flowing a reactor feed gas through an annular space formed between the outside of the basket and the inside of the outer pressure shell. The heat transferred to the feed gas from the exothermic reaction occurring in the basket preheats the feed gas to the required reaction temperature prior to the feed gas being passed to the catalyst beds. The preheated feed gas then passes to the catalyst beds directly or via an internal heat exchanger, where at least a portion of the flow is converted into a by-product such as ammonia or other known chemical compounds.

The heats and pressures generated by the exothermic synthesis in the annular space between the basket and the outer pressure shell are significant. The design of the basket must take into account the physical realities of the reaction within the catalyst beds by increasing the wall thicknesses of the basket and selecting other metallurgical parameters necessary for the baskets to survive the heat generated during the exothermal process. The design of the outer pressure shell must also take these physical realities into account since the outer shell is exposed to significant heat and pressure during, among other things, the pre-heating of the feed gas prior to introduction into the basket. The metallurgic requirements can drive significant costs into the design and construction of an exothermal reaction chamber. There is a need, therefore, to provide a new system and method that can reduce the metallurgic requirements of exothermal reaction chambers, including those reaction chambers used in the production of ammonia or other known chemicals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
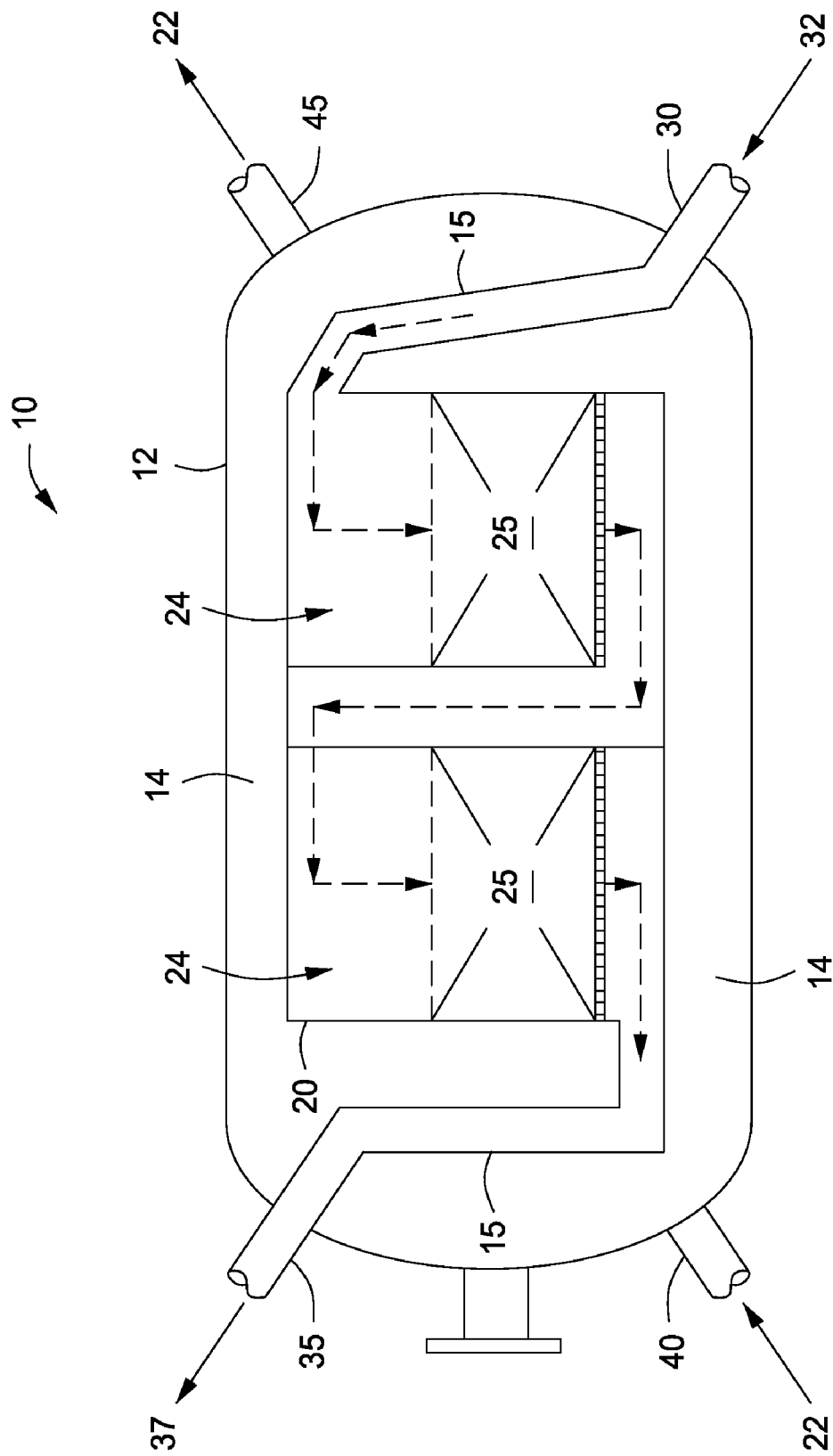
FIG. 1 depicts a schematic of an illustrative cold wall synthesis reactor for producing ammonia and/or other chemicals, according to one or more embodiments.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for the synthesis of one or more chemicals, including ammonia, are provided. In at least one specific embodiment, nitrogen and hydrogen can be supplied to a reaction zone disposed inside an inner shell. The inner shell can be disposed inside an outer shell such that a space is formed therebetween. The reaction zone can include at least one catalyst bed in indirect heat exchange with the space. The nitrogen and hydrogen can be reacted in the reaction zone in the presence of at least one catalyst to form an effluent comprising ammonia. The effluent can be recovered from the inner shell and cooled to provide a cooled effluent stream. A cooling fluid can be provided to the outer shell such that the cooling fluid flows through at least a portion of the space and is in fluid communication with the exterior of the inner shell. At least a portion of the cooled effluent can provide at least a portion of the cooling fluid. The cooling fluid can then be recovered from the outer shell as an ammonia product.

In at least one other specific embodiment, a synthesis reactor is provided. The reactor can include an inner shell disposed inside an outer shell. A first space can be formed inside the inner shell. The first space can be referred to as a reaction zone. A second space can be formed between the inner shell and the outer shell. In one or more embodiments, at least a portion of the second space can be an annular space. The inner shell and the outer shell can be any shape or size. The synthesis reactor can include one or more catalyst beds disposed in the first space. In one or more embodiments, one or more catalysts can be disposed in the one or more catalyst beds. The catalyst in the catalyst beds can be modified to synthesize one or more chemicals, for example ammonia.

In operation, the synthesis reactor can be the primary and/or secondary synthesis unit in a plant or facility. In one or more embodiments, a feed stream can be introduced into the reaction zone and an exothermal reaction between the catalyst and the feed stream can take place. In one or more embodiments, a cooling fluid can be directed through the second space to cool the inner shell and the outer shell. In one or more embodiments, the outer shell can be cooled such that the outer shell temperature can be maintained at a lower temperature than the inner shell temperature. The synthesis reactor can be referred to as a cold wall synthesis reactor.

FIG. 1 depicts a schematic of an illustrative cold wall synthesis reactor for producing ammonia and/or other chemicals, according to one or more embodiments. In one or more embodiments, the reactor 10 can include an inner shell 20 disposed inside an outer shell 12. A reaction zone 24 can be formed inside the inner shell 20. A space 14 can be formed between the inner shell 20 and the outer shell 12. One or more catalyst beds 25 can be disposed inside the inner shell 20. The reactor 10 can include one or more tubes 15, one or more inner shell inlets 30, and one or more inner shell outlets 35. The one or more tubes 15, the one or more inner shell inlets 30, and the one or more inner shell outlets 35 can be in fluid communication with the reaction zone 24. The outer shell 12 can include one or more outer shell inlets 40 and one or more outer shell outlets 45. The one or more outer shell inlets 40 and the one or more outer shell outlets 45 can be in fluid communication with the space 14. In one or more embodiments, the inner shell 20 and the tubes 15 can form a first plenum inside the outer shell 12. The outer shell 12 can form a second plenum surrounding the inner shell 20. In one or more embodiments, the outer shell 12, the one or more outer shell inlets 40, and the one or more outer shell outlets 45 can form a second plenum surrounding the inner shell 20.

In one or more embodiments, the inner shell 20 can have any shape cross-section including a circular cross-section. In one or more embodiments, the inner shell 20 can include fins (not shown) disposed on the inside and/or the outside of the inner shell 20. The fins can enhance heat transfer from the reaction zone 24 and/or the inner shell 20 to the space 14.

In one or more embodiments, the inner shell 20 and the one or more catalyst beds 25 can be supported inside the outer shell 12 by the one or more tubes 15. The inner shell 20 can be supported by a secondary structure attached to the inner shell 20 and the outer shell 12 (not shown). The inner shell 20 can be supported inside the outer shell 12 by any known structural support concept. In one or more embodiments, the inner shell 20 can be removably disposed inside the outer shell 12. The catalyst beds 25 can be supported inside the inner shell 20 by any known structural support concept. In one or more embodiments, one or more baffles (not shown) can separate two or more catalyst beds 25.

In one or more embodiments, the one or more catalyst beds 25 can contain a catalyst capable of reacting with hydrogen and nitrogen to create ammonia. The catalyst contained in the one or more catalyst beds 25 can be one or more platinum-group metals, carbon based catalysts, magnetites, and/or combinations thereof.

In one or more embodiments, the outer shell 12 can have any shape cross-section including a circular cross-section. In one or more embodiments, the outer shell 12 can include fins (not shown) disposed on the inside and/or the outside of the outer shell 12. The fins can enhance heat transfer from the outer shell 12 to the space 14.

Although not shown, one or more inner shells 20 can be disposed inside the outer shell 12. The one or more inner shells 20 can be in fluid communication with each other and can be configured in series and/or in parallel to each other. In one or more embodiments, the one or more inner shells 20 can have one or more catalyst beds 25 disposed in each inner shell 20 to define one or more reaction zones 24.

In one or more embodiments, the totality of the components in the inner shell 20 can be constructed using materials including stainless steel, incoloy, inconel, titanium, other high alloy metals and/or combinations thereof. In one or more embodiments, the outer shell 12 can be constructed using materials including carbon steel, other low alloy metals, and/or combinations thereof. Low alloy metals can be less expensive than high metal alloys. For example, it can be less expensive to purchase low alloy metals as compared to high alloy metals. It can also be less expensive to fabricate components using low alloy metals as compared to using high alloy metals. In one or more embodiments, the outer shell 12 can be produced at a lower cost than the inner shell 20. In one or more embodiments, a high alloy metal is defined as a metal containing 8% by weight or more nickel and/or chromium. In one or more embodiments, a high alloy metal is defined as a metal containing 6% by weight or more nickel and/or chromium. In one or more embodiments, a low alloy metal is defined as a metal containing less than 6% by weight nickel and/or chromium.

It should be understood that although the synthesis reactor 10 in FIG. 1 is shown generally in a horizontal configuration having the catalyst beds 25 in series, this is no limitation on the orientation and/or catalyst bed configurations in the one or more embodiments described herein. For example, the synthesis reactor 10 can be installed in a generally vertical configuration. In the vertical configuration, the one or more catalyst beds 25 can be disposed one above another in the reaction zone 24. Fluid can flow through the reaction zone 24 from the top of the vertically oriented synthesis reactor 10 to the bottom of the vertically oriented synthesis reactor 10.

In one or more embodiments, during synthesis reactor 10 operation, a feed stream 32 can contain nitrogen and hydrogen and can be supplied to the inner shell inlet 30. The feed stream 32 can be directed through the reaction zone 24. The feed stream 32 can flow from the top to the bottom of each catalyst bed 25. The feed stream 32 can flow over the one or more catalyst beds 25 either directly or via a heat exchanger (not shown) disposed inside the inner shell 20. The resultant reaction between the catalyst in the catalyst beds 25 and the feed stream 32 can produce an effluent 37 that can have an increased ammonia content relative to the feed stream 32. The effluent 37 can be recovered from the inner shell outlet 35 for further processing. The direction of flow of the feed stream 32, as described above, is not limiting and in one or more embodiments, the feed stream 32 can flow from the bottom to the top of each catalyst bed 25.

A cooling medium, such as a cooling fluid 22, can be used to remove the heat generated by the reaction between the feed stream 32 and the catalyst in the catalyst beds 25. In one or more embodiments, the cooling fluid 22 can be supplied to the outer shell inlet 40. The space 14 can direct the cooling fluid 22 over at least a portion of the inner shell 20 and can be in indirect heat exchange relationship with the reaction zone 24. The cooling fluid 22 can remove at least a portion of the reaction heat generated by the reaction between the feed stream 32 and the catalyst in the one or more catalyst beds 25. The cooling fluid can then be directed to and can be recovered from the outer shell outlet 45 for further uses as discussed below or as are known in the art. It should be understood that although only one inlet 30, 40 and one outlet 35, 45 are shown for both the inner shell 20 and the outer shell 12, there are no limits on the number of the inlets 30, 40 and the outlets 35, 45.

In one or more embodiments, the cooling fluid 22 can flow through the space 14 in a counter-current direction to the feed stream 32. In one or more embodiments, the cooling fluid 22 can flow through the space 14 in a co-current direction to the feed stream 32.

In one or more embodiments, the cooling fluid 22 can be any fluid. In one or more embodiments, the cooling fluid 22 can transfer heat from the inner shell 20 and from the outer shell 12. In one or more embodiments, the outer shell 12 can be cooled such that the outer shell 12 temperature can be maintained at a lower temperature than the inner shell 20 temperature and the synthesis reactor 10 can be referred to as a cold wall synthesis reactor 10. In one or more embodiments, the average temperature of the reaction zone 24 can be maintained at a temperature between from about 600° F. to about 950° F. and the average temperature of the outer shell 12 can be maintained at a temperature between from about 100° F. to about 600° F.

The average temperature of the reaction zone 24 and the outer shell 12 can be maintained by introducing the cooling fluid 22 that can have a temperature between from about 95° F. to about 600° F. In one or more embodiments, the average temperature of the reaction zone 24 and the outer shell 12 can be maintained by introducing the cooling fluid 22 having a temperature between from about 95° F. to about 400° F. and having a mass flow rate of between about 10 percent and about 100 percent of the mass flow rate of the feed stream.

In one or more embodiments, the one or more cold wall synthesis reactors 10 can be operated in a plant or facility. The one or more cold wall synthesis reactors 10 can be configured in the plant in parallel and/or in series relative to one another. The one or more cold wall synthesis reactors 10 can be the primary and/or secondary synthesis units in a plant.

Figure 2:
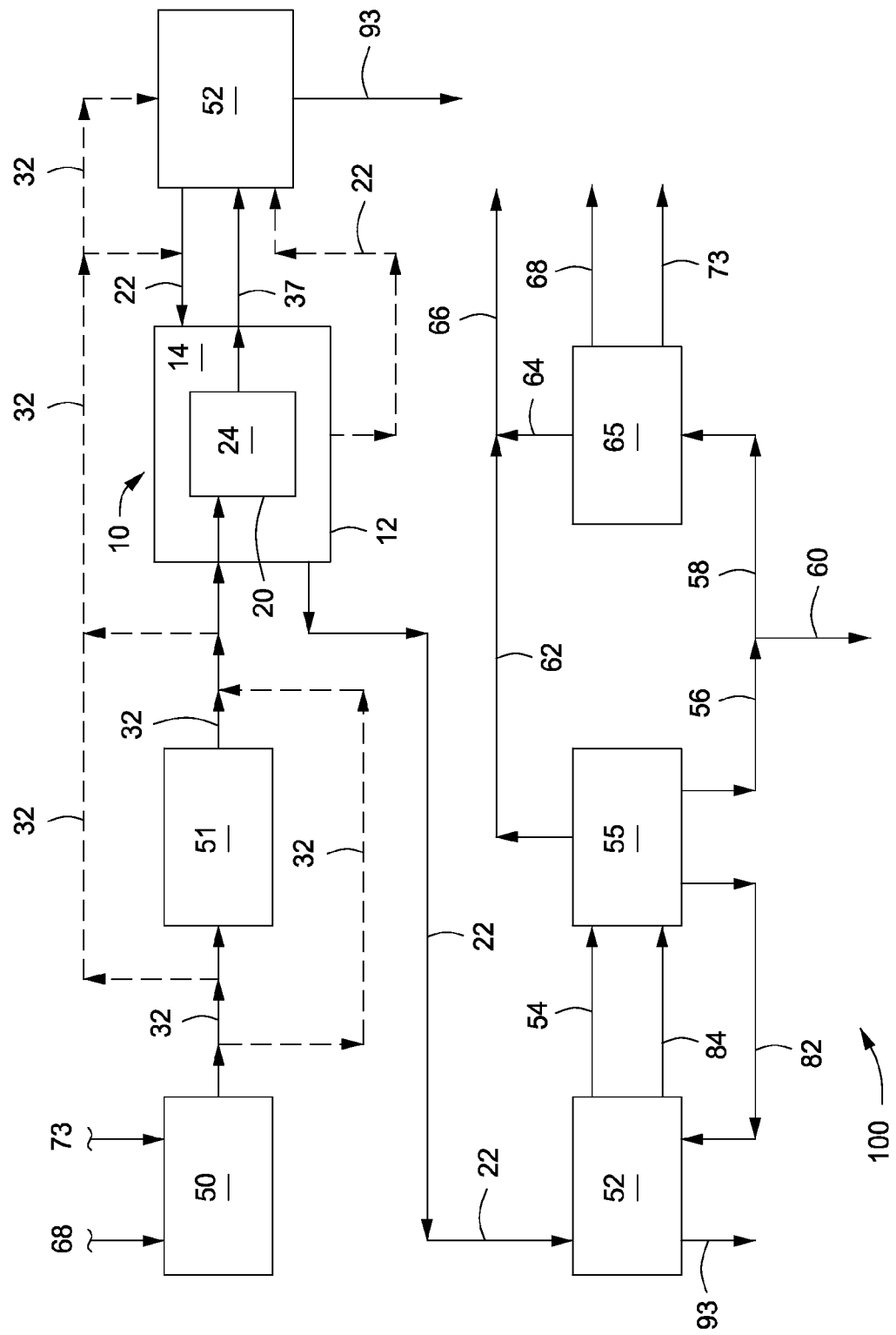
FIG. 2 depicts a schematic of an illustrative system for producing ammonia using a cold wall synthesis reactor, according to one or more embodiments.

FIG. 2 depicts a schematic of an illustrative system for producing ammonia using a cold wall synthesis reactor according to one or more embodiments. In one or more embodiments, the ammonia plant 100 can include a cold wall synthesis reactor 10. The cold wall synthesis reactor 10 can be a primary ammonia reactor for the ammonia plant 100 as part of a primary synthesis loop. The primary synthesis loop can include, one or more cold wall synthesis reactors 10, one or more reformers 50; one or more conditioning units 51; one or more chillers or condensation/purification units 52; one or more ammonia recovery units 55; and one or more hydrogen recovery units 65. The cold wall synthesis reactor 10 can include an outer shell 12, an inner shell 20, a space 14 formed between the inner shell 20 and the outer shell 12, and a reaction zone 24 formed within the inner shell 20.

In operation, the reformer 50 can supply a syngas or feed stream 32 to the cold wall synthesis reactor 10 at a suitable pressure and temperature for ammonia synthesis. In one or more embodiments, the feed stream 32 can be thermally conditioned and/or compressed in the conditioning unit 51 prior to being supplied to the cold wall synthesis reactor 10. In one or more embodiments, the feed stream 32 can include nitrogen and hydrogen with a purity of from about 90 to 100 volume percent. The feed stream 32 can include nitrogen and hydrogen with a purity of from about 97.5 to 99.5 volume percent. In one or more embodiments, the feed stream 32 can include from about 50 to about 75 volume percent hydrogen and from about 25 to about 40 volume percent nitrogen.

The feed stream 32 can be reacted in the reaction zone 24 and the resulting effluent 37 can be directed to the one or more chillers 52 for cooling and/or thermal conditioning for ammonia condensing. After at least some cooling, at least a portion of the cooled effluent 37 can be directed to the space 14 as at least a portion of a cooling fluid 22 for cooling or transferring heat from the cold wall synthesis reactor 10. After the cooling fluid 22 exits the cold wall synthesis reactor 10, the cooling fluid 22 can be directed to one or more of the chillers 52 for ammonia condensing and purification, and can yield a purified ammonia 93, in a manner known in the art.

In one or more embodiments, a slipstream 84 of partially purified ammonia can be diverted to the ammonia recovery unit 55 for use as a makeup fluid to ammonia distillation. A flashed refrigerant slipstream 54 comprising low pressure ammonia plus non-condensable gases and other vapor from the refrigeration in chillers 52 can be diverted to the ammonia recovery unit 55 to separate water vapor and non-condensable gases. The ammonia recovery unit 55 can return an upgraded, low pressure ammonia vapor 82 to the chillers 52. The ammonia recovery unit 55 can produce a low-pressure waste gas 62, typically at a low mass flow rate of about 0.1 to 0.5 percent of the mass flow rate of the feed stream 32.

A high-pressure purge gas 56 can be taken from the ammonia recovery unit 55 to remove inert gases such as argon, carbon dioxide, and methane that can accumulate in the primary synthesis loop. At least a portion 58 of the purge gas 56 can be sent to the hydrogen recovery unit 65. Hydrogen can be recovered as low-pressure hydrogen 68 and a high-pressure hydrogen 73 can be recycled with the feed gas 32 to reformer 50 and the cold wall ammonia synthesis unit 10. A waste gas 64 comprising primarily nitrogen, plus argon, carbon dioxide, and methane in minor proportions can flow together with a waste gas 62 to a 66. Another portion of the purge gas 56 can be supplied as a feed 60 to a secondary synthesis loop or unit, not shown. The secondary synthesis unit can be one or more secondary synthesis units known in the art and/or one or more cold wall synthesis reactors 10.

In one or more embodiments, during initial ammonia plant 100 start-up, at least a portion of the feed stream 32 can be directed to the space 14 and can act as an initial cooling fluid 32 charge in the space 14. In one or more embodiments, at least a portion of the feed stream 32 can be directed to one or more chillers 52 prior to being supplied to the space 14 as an initial charge in the space 14.

The cooling fluid 22 can remove heat from the cold wall synthesis reactor 10 such that the outer shell 12 average temperature can be maintained at between about 100° F. to about 600° F. In one or more embodiments, the average temperature of the cooling fluid 22 can be maintained at between about 200° F. and 500° F. The average temperature of the cooling fluid 22 can be maintained at between about 400° F. and 500° F. In one or more embodiments, the mass flow rate of the cooling fluid 22 can be maintained at between about 10% to about 100% of the feed stream 32. In one or more embodiments, the mass flow rate of the cooling fluid 22 can be maintained at between about 90% to about 100% of the feed stream 32. In one or more embodiments, the cooling fluid 22 can be directed to the cold wall synthesis reactor 10 at a point in the primary synthesis loop where the cooling fluid 22 can be maintained at between about 200° F. and 500° F.

In one or more embodiments, the cooling fluid 22 can remove heat from the cold wall synthesis reactor 10 such that the reaction zone 24 average temperature can be maintained at between about 600° F. to about 950° F. The cooling fluid 22 can remove heat from the cold wall synthesis reactor 10 such that the reaction zone 24 average temperature can be maintained at between about 570° F. to about 1200° F.

Figure 3:
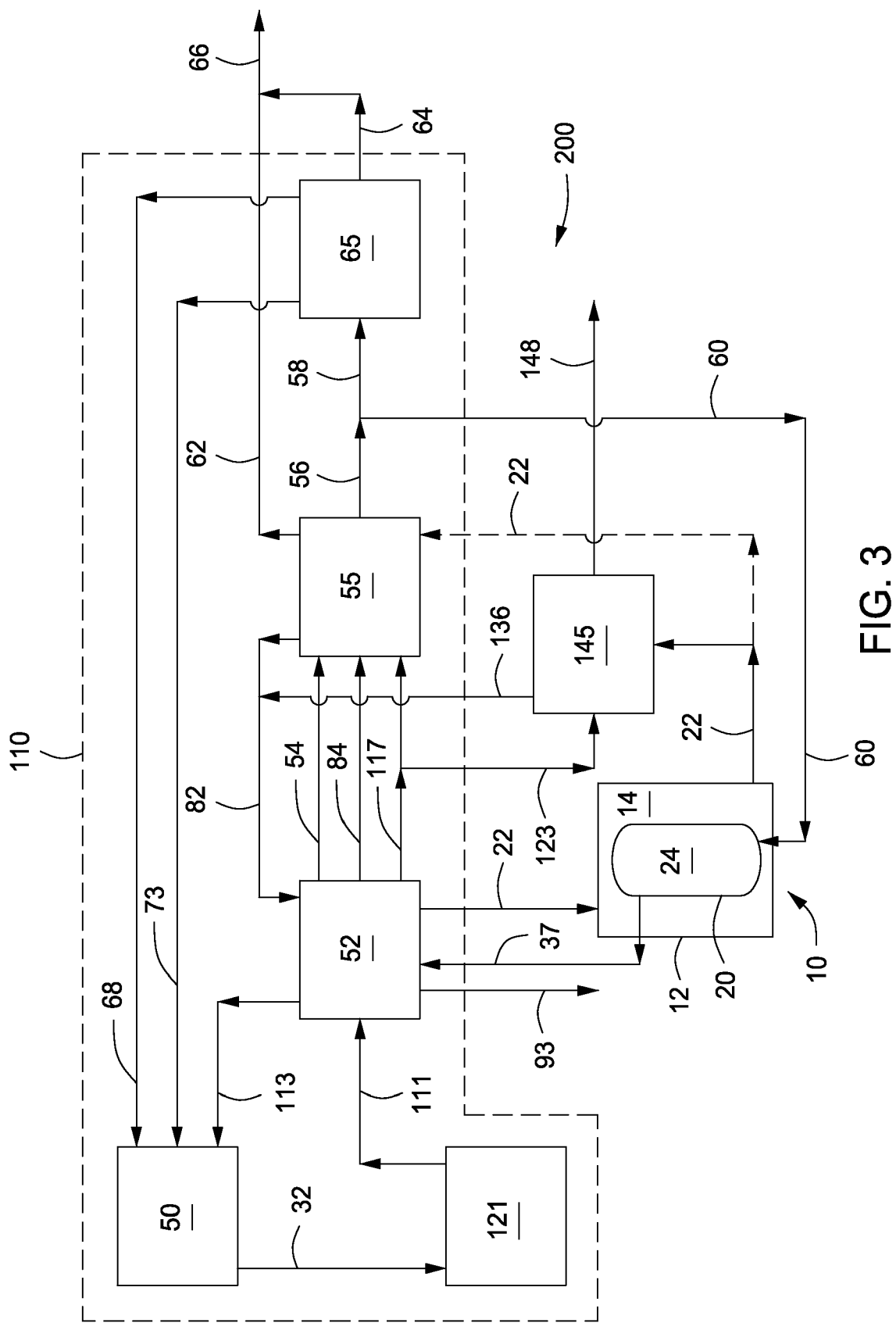
FIG. 3 depicts a schematic of an illustrative system for producing ammonia using one or more primary synthesis reactors and one or more secondary synthesis reactors, according to one or more embodiments.

FIG. 3 depicts a schematic of an illustrative system for producing ammonia using one or more primary synthesis reactors and one or more secondary synthesis reactors according to one or more embodiments. In one or more embodiments, the ammonia plant 200 can incorporate the cold wall synthesis reactor 10 as a secondary reactor integrated with a primary ammonia synthesis loop 110. In one or more embodiments, one or more cold wall synthesis reactors 10 can be incorporated as secondary reactors, in situ, into an original ammonia plant primary ammonia loop 110. The primary ammonia loop 110 can include a reformer 50, a primary ammonia synthesis unit 121, an ammonia condensation and purification or chiller unit 52, an ammonia recovery unit 55, and a hydrogen recovery unit 65, all of which are known in the art.

In operation, a feed stream 32 of nitrogen and hydrogen can have a purity of from about 95 to 100 volume percent. In one or more embodiments, the feed stream 32 can have a purity of from about 97.5 to about 99.5 volume percent. The reformer 50 can supply the feed stream 32 at a suitable pressure for ammonia synthesis. The feed stream 32 can be directed to the primary ammonia synthesis unit 121, and an ammonia-rich product gas 111 can flow to the chiller unit 52 for refrigeration and condensation. An ammonia-lean feed 113 can be recirculated to the reformer 50 and a slip 84 of an ammonia-lean feed vapor can be diverted to the ammonia recovery unit 55 to separate water vapor and non-condensable gases. Condensate formed in equilibrium with the recirculated feed 113 can be used as a makeup refrigerant in the chiller unit 52. The makeup refrigerant and the ammonia-rich product gas 111 can cyclically condense and flash through a plurality of stages, not shown, within the chiller unit 52, and can yield a purified ammonia 93, in a manner known in the art.

A slipstream 117 of partially purified ammonia refrigerant can be diverted to the ammonia recovery unit 55 for use as a makeup liquid to ammonia distillation. A flashed refrigerant slipstream 54 including low pressure ammonia plus noncondensable gases and other vapor from the refrigeration can be diverted to the ammonia recovery unit 55 to separate water vapor and noncondensable gases. The ammonia recovery unit 55 can return an upgraded, low pressure ammonia vapor 82 to the refrigeration subsystem. The ammonia recovery unit 55 can produce a low-pressure wastegas 62.

A high-pressure purge gas 56 can be taken from the ammonia recovery unit 55 to remove inert gases such as argon, carbon dioxide, and methane that can accumulate in the primary ammonia synthesis loop 110. A portion 58 of the purge gas 56 can be sent to the hydrogen recovery unit 65. Hydrogen recovered as low-pressure hydrogen 68 and high-pressure hydrogen 73 can be recycled to the reformer 50 and to the primary ammonia synthesis unit 121. A waste gas 64 comprising primarily nitrogen, plus argon, carbon dioxide, and methane in minor proportions can flow together with the waste gas 62 to a stream 66.

Another portion of the purge gas 56 can be supplied as a secondary ammonia product or a feed 60 to a secondary ammonia synthesis loop including a cold wall synthesis reactor 10 having the inner shell 20, the outer shell 12, the reaction zone 24, and the space 14. In one or more embodiments, the cold wall synthesis reactor 10 can be in fluid communication with the chiller unit 52 for cooling an effluent 37. In one or more embodiments, after the feed 60 passes through the reaction zone 24, the cold wall synthesis reactor 10 can produce an ammonia-rich effluent 37 that can be directed to the chiller unit 52 for some cooling. After some cooling, the cooled effluent or cooling fluid 22 can be directed back through the cold wall synthesis reactor 10, for cooling, and fed to an ammonia recovery unit 145. In one or more embodiments, the cooling fluid 22 exiting the cold wall synthesis reactor 10 can be directed to the ammonia recovery unit 55. The ammonia recovery unit 145 can import a partially purified ammonia refrigerant 123 from the chiller 52 as a makeup liquid for ammonia distillation, and can return a high-concentration ammonia vapor 136 to a stream 82. Ammonia-lean stream 148 can include nitrogen and hydrogen and other gases at relatively high pressure, and if desired can be recycled to the reformer 50 and the primary synthesis unit 121. In operation, the secondary synthesis can improve plant productivity by about 5 to 50 percent, for example 10 to 25 percent, of the feed 60.

The cooling fluid 22 can remove heat from the cold wall synthesis reactor 10 such that the outer shell 12 average temperature can be maintained at between about 100° F. to about 600° F. In one or more embodiments, the average temperature of the cooling fluid 22 can be maintained at between about 200° F. and 500° F. In one or more embodiments, the mass flow rate of the cooling fluid 22 can be maintained at between about 50% to about 90% of the feed stream 32 while the temperature of the cooling fluid steam 22 can be maintained at between about 100° F. to about 600° F. The cooling fluid 22 can remove heat from the cold wall synthesis reactor 10 such that the reaction zone 24 average temperature can be maintained at between about 570° F. to about 1200° F. The cooling fluid 22 can remove heat from the cold wall synthesis reactor 10 such that the reaction zone 24 average temperature can be maintained at between about 600° F. to about 950° F.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges can appear in one or more claims below. All numerical values are "about" or "approximately" the indicated value, and take into account experimental error and variations that would be expected by a person having ordinary skill in the art.

Certain embodiments and features have been described using a set of numerical upper limits and a set of numerical lower limits. Ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making ammonia, comprising:
   supplying nitrogen and hydrogen to a reaction zone, the reaction zone disposed inside an inner shell and the inner shell disposed inside an outer shell such that a space is formed therebetween, wherein the reaction zone comprises at least one catalyst bed comprising at least one catalyst in indirect heat exchange with the space;
   reacting the nitrogen and hydrogen in the reaction zone to form an effluent comprising ammonia;
   recovering the effluent from the inner shell;
   cooling the recovered effluent to provide an $NH_3$-comprising cooled effluent stream;
   supplying a cooling fluid to the outer shell such that the cooling fluid flows through at least a portion of the space and is in fluid communication with the exterior of the inner shell;
   wherein at least a portion of the $NH_3$-comprising cooled effluent provides at least a portion of the cooling fluid; and
   recovering the cooling fluid at an outlet fluidly connected to the outer shell as an ammonia product.

2. The method of claim 1, wherein the cooling fluid maintains the reaction zone temperature of from about 570° F. to about 1,200° F.

3. The method of claim 1, wherein the cooling fluid maintains the outer shell at a temperature of from about 100° F. to about 600° F., and wherein the cooling fluid maintains the reaction zone at a temperature of from about 600° F. to about 950° F.

4. The method of claim 1, wherein the reaction zone comprises two or more catalyst beds in indirect heat exchange with the cooling fluid in the space.

5. The method of claim 1, wherein the outer shell is constructed of one or more materials selected from the group consisting of carbon steel, other low alloy metals, and combinations thereof.

6. The method of claim 5, wherein the inner shell and the reaction zone is constructed of one or more materials selected from the group consisting of stainless steel, incoloy, inconel, titanium, other high alloy metals and combinations thereof.

7. The method of claim 1, wherein the nitrogen and hydrogen are fed to the reaction zone at a rate sufficient to provide a molar ratio of about 1:1 to about 1:4.

8. The method of claim 1, wherein the catalyst in the catalyst bed is selected from the group consisting of magnetite, platinum-group metals, carbon based catalysts, and combinations thereof.

9. The method of claim 1, further comprising introducing a purge gas from a primary ammonia synthesis loop to the reaction zone.

10. A method for converting an original ammonia plant to a converted ammonia plant comprising:
 installing a secondary ammonia synthesis loop for reacting a feed stream to form ammonia, wherein the secondary ammonia synthesis loop comprises a cold wall synthesis reactor in fluid communication with a chiller unit, wherein the cold wall synthesis reactor comprises an inner shell disposed within an outer shell and a reaction zone disposed within the inner shell, wherein a space is formed between the inner shell and the outer shell, wherein the reaction zone comprises one or more catalyst beds in indirect heat exchange with the space, and wherein each catalyst bed includes at least one catalyst;
 introducing the feed stream into the reaction zone through a first inlet;
 discharging an effluent from the reaction zone through a first outlet, wherein the first inlet, the reaction zone, and first outlet provide a first plenum through the outer shell;
 introducing a cooling fluid into the space through a second inlet; and
 discharging the cooling fluid from the space through a second outlet.

11. The method of claim 10, wherein the secondary ammonia synthesis loop comprises an ammonia recovery unit to separate an ammonia-rich stream from the secondary ammonia product and for a residual gas for recycle to a reformer feed.

12. The method of claim 10, wherein the outer shell of the cold wall synthesis reactor is constructed using materials selected from the group consisting of carbon steel, other low alloy metals, and combinations thereof.

13. The method of claim 12, wherein the inner shell and the reaction zone of the cold wall synthesis reactor is constructed using material selected from the group consisting of stainless steel, incoloy, inconel, titanium, other high alloy metals and combinations thereof.

14. The method of claim 10, wherein the catalyst is selected from the group consisting of magnetite, platinum-group metals, carbon based catalysts and combinations thereof.

15. The method of claim 10, further comprising introducing a purge gas from a primary ammonia synthesis loop to the cold wall synthesis reactor.

\* \* \* \* \*